Patented Jan. 2, 1945

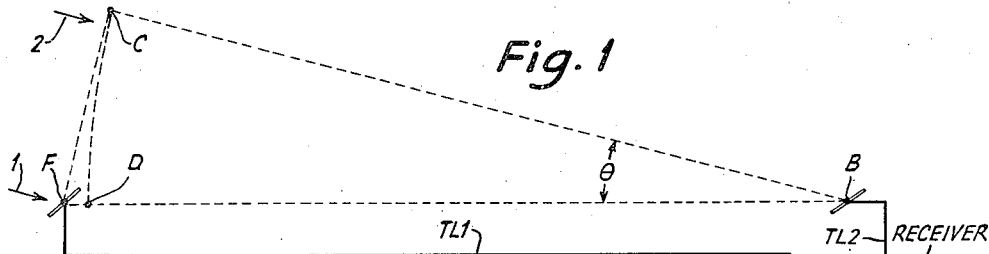
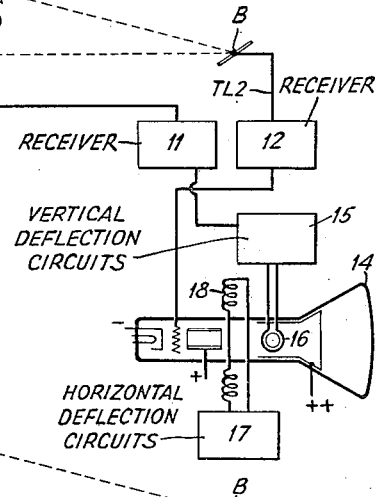
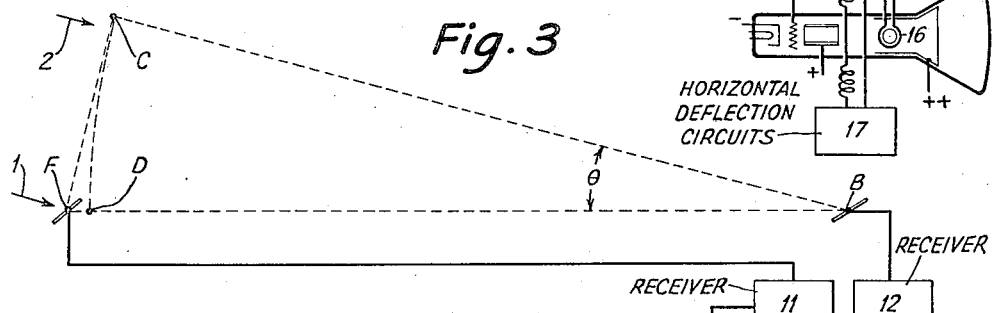
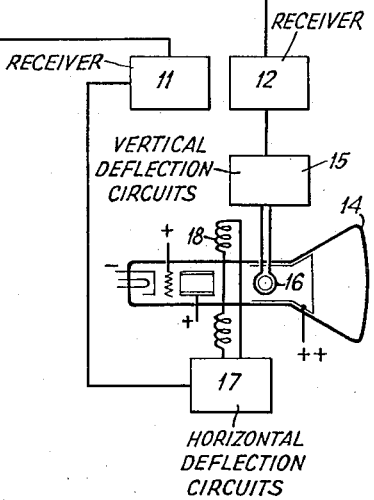
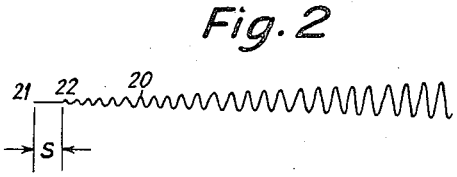
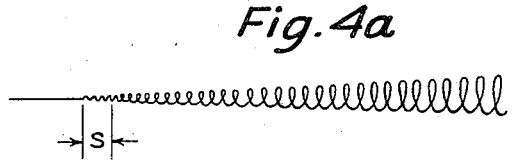
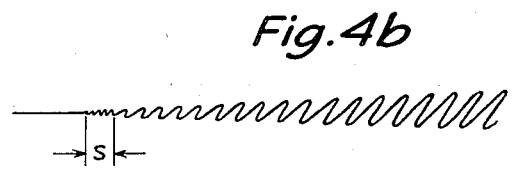

2,366,632

UNITED STATES PATENT OFFICE 2,366,632

METHOD OF AND MEANS FOR INVESTIGATING ETHER PROPAGATION PATHS

Nils E. Lindenblad, Rocky Point, and James L. Finch, East Rockaway, N. Y., assignors to Radio Corporation of America, a corporation of Delaware Application November 29, 1941, Serial No. 420,934

7 Claims. (Cl. 250—11)

The present invention relates to organizations particularly adapted to the measurement of the vertical angle of arrival of radio signals over ether propagation paths.

An object of the present invention is the measurement of the vertical angle of arrival of various elements of a received radio signal.

Another object of the present invention is the provision of means for directly and accurately measuring the angle of arrival of radio signals.

The foregoing objects, and others which may appear from the following detailed description are attained in accordance with the principles of the present invention by transmitting from the transmitting station very short and equally timed pulses. The duration of these pulses may be of the order of 100 microseconds and their spacing may be of the order of 1/30 of a second. At the receiving location two signal collecting elements, or receiving antennas, are employed, the antennas being arranged in the plane of propagation of the signal and spaced a considerable distance apart, say, of the order of 15,000 meters. The difference in time of arrival of each signal impulse at the spaced antennas is measured. The difference in time, the distance between the antennas, and the speed of radio signals through the ether provides a measure of the angle of arrival of the signals.

The signal elements which arrive over one major path usually come at a definite time interval different from those arriving over any of the other major paths. This time difference is much greater than the time difference caused by the variation in angle of arrival as it affects the two receivers. Advantage is taken of the difference in time of arrival of the signal over one major path from that over the others so that the signal arriving over this major path and received by the two separate receivers is not confused with adjacent impulses arriving by different paths.

The present invention employs a cathode ray oscilloscope for distinguishing the signals arriving over the different major paths and, also, for determining the time difference in arrival of each signal at the two receiving antennas or signal collecting elements. In the operation of the oscilloscope the cathode ray is swept across the screen in the same manner and at the same frequencies as is at present in use in television receivers. The sweep is synchronized with the pulse frequency. Thus one pulse arrives for each complete scanning of the screen. The received pulses over the various paths are caused to distinctively influence the appearance of the scanned lines across the screen, depending upon the receiver at which they arrive. The signal arriving over each major path occupies several horizontal sections of the kinescope screen, their vertical spacing along the screen being a measure of the time difference of arrival of the various signal impulses. The horizontal spacing between the point where the signal from one receiver has characteristically influenced the appearance of the scanned line across the screen and that where the signal from the other receiver has also characteristically influenced the appearance of the line is a measure of the relative time of arrival at the two receivers and, thus, a measure of the angle of arrival.

The present invention will be more fully understood by reference to the following detailed description which is accompanied by a drawing in which Figure 1 illustrates one embodiment of the invention; Figure 2 illustrates a typical indication of the signal as received on the oscilloscope screen; Figure 3 is a modification of Figure 1, while Figures 4a and 4b are signal traces similar to that shown in Figure 2 but for the modification of the invention shown in Figure 3.

Referring, now, to Figure 1, there is shown a pair of receiving antennas F and B. F represents the front receiving antenna and B the back receiving antenna, both being adjacent the earth's surface. Arrow 1 represents the path of a signal arriving over a particular ether path which will be received by the front receiving antenna F, while arrow 2 represents the path of the same signal which will be received by the back receiving antenna B. $\theta$ is the angle which these arrows make with the earth's surface. Two signal elements 1 and 2 arrive at points F and C at the same time. Signal elements 2 arrive at antenna B at a later time equal to the length of the line CB divided by the speed of the radio signal. Preferably, the receiving antennas F and B are connected to receiving apparatus 11 and 12 through transmission lines TL1 and TL2 of different length. The difference in the length of transmission lines TL1 and TL2 is such that the difference in time of arrival of the signal over the two lines is equal to the time required for a signal to travel from F to B. Thus, if a signal arrives parallel to the earth's surface, that is, when angle $\theta$ is zero, the portion of the signal energy picked up by F will arrive at the receiving equipment at the same time as that picked up by B. If the signal arrives at some angle above the earth's surface say, for instance, if angle $\theta$ is 15 degrees, then the signal arriving through TL2 arrives slightly earlier than that arriving through transmission line TL1. This is because the path of signal element 2 over CB is shorter than the path of signal element 1 over FB by the amount FD, the length DB being equal to CB. Thus, the difference in time of arrival will be equivalent to the time required for a radio signal to travel the distance FD. This distance may be determined by the relation FB $(1-\cos \theta)$. If, for instance, the distance FB is 15,000 meters the distance FD will be 510 meters. The time for a radio signal to travel this distance will be equal to $510/300000000$ of a second.

Receiver 12 is coupled to the intensity control grid of oscilloscope 14. Receiver 11 is coupled to the vertical deflection circuits 15 of the oscilloscope 14. In the particular embodiment shown, the deflection circuits 15 and 17 for the cathode ray tube, for vertical and horizontal scanning respectively, are indicated as having their outputs connected to deflecting coils 16 and 18 though electrical deflection employing deflecting plates within kinescope 14 may be used if desired.

If the screen of kinescope 14 is being scanned at the rate of 441 lines, 30 times a second, and if the length of each of these lines is 10 inches, then the speed of scanning will equal $$441 \times 30 \times 10 = 132,300$$

inches per second. During the time calculated above as being required for the signal to travel the distance FD the cathode ray spot will travel on the screen a distance of $$S = 132,300 \times 510/300000000 = .22 \text{ inch}$$

Thus, a space of .22 inch on the kinescope screen between the indications or arrival of a particular signal impulse over the two receiving antennas indicates that the angle of arrival is 15 degrees with the earth's surface. This is indicated in Figure 2 wherein the trace of the scanning spot is indicated by line 20.

The arrival of the first received signal element from antenna B changes the bias on the intensity control grid of kinescope 14 to cause the trace on the screen to become visible or increase in intensity as indicated at 21 of Figure 2. The arrival of a later received signal element from antenna F causes an additional vertical deflection of the trace on the screen of kinescope 14 at the frequency of the signal. This is indicated at 22 of Figure 2. Direct measurement of the distance between the beginning of the trace at 21 and the beginning of the added vertical deflection at 22 gives the quantity S. This quantity, as before explained, is a function of the angle of arrival of each signal impulse. The angle may be determined by the equation $$\theta = \cos^{-1}\frac{(1 - 300,000,000S)}{441 \times 30 \times 10 \times FB}$$

Similarly, any other angle of arrival is represented by a particular difference on the oscilloscope.

Modifications of the present invention involve the means by which the signal received from receiving antenna F may be differentiated from that received over receiving antenna B on the viewing screen of the oscilloscope 14. The simplest arrangement is that in which the intensity of the light spot is increased when a signal is being received in proportion to the intensity of the signal. Thus, when the first element of the signal arrives the line, due to the scanning of the cathode ray over the viewing screen, assumes a particular intensity corresponding to the intensity of the signal element. When the second element arrives it assumes a greater intensity. The distance between these two points on the kinescope screen may be measured and the angle $\theta$ computed, as above explained. If, however, the received signal builds up slowly compared with the difference in time of arrival of the two elements, the preferable arrangement is that already described wherein each first arriving signal impulse increases the brilliancy of the spot and the later arriving signal impulse is caused to deflect the spot in a vertical direction. With this arrangement there appears on the screen for each impulse from receiver B a short path over which the spot is brighter than the remainder but over which no vertical deflection occurs. The arrival of the corresponding impulse over antenna F then causes a vertical deflection which may gradually build up.

Another arrangement for differentiation between the arrival time of each signal impulse at the two receivers is to allow the spot intensity to remain constant at all times and to cause the first impulse to deflect the spot in a vertical direction at its signal frequency and the second impulse to deflect the spot horizontally. This is shown in Figure 3. Patterns for this arrangement will then be traced as indicated in Figures 4a and 4b, depending upon whether the phase angle of the two elements is 90 degrees or 0 degrees, respectively. Other phase angles would, of course, cause different patterns. In any case, the space S is a measure of the angle $\theta$.

If desired, the two transmission lines TL1 and TL2 may be made of exactly equal electrical length. The two signal elements then give indications on the kinescope screen separated by a known distance when the signals are known to be parallel with the earth's surface. This may be established by setting up a test transmitter in front of the two antennas and relatively near to them. Then, when a signal arrives at some angle other than zero, the indications on the kinescope screen will be increased by an amount equal to the distance S in the previously described embodiments. The same calculation, as before, then gives the vertical angle of arrival.

While we have particularly shown and described several embodiments of our invention, it is to be clearly understood that our invention is not limited thereto but that modifications may be made within the scope of the invention.

We claim:

1. A radiant energy system including a plurality of signal collecting elements spaced along the line of propagation of a signal, receiving means coupled to each of said signal collecting elements, a cathode ray oscilloscope having a luminescent screen, means for continuously so deflecting a cathode ray across said screen as to scan said screen in a plurality of parallel lines at a predetermined rate, and means coupled to each of said receiving means for separately influencing said cathode ray in a distinctive manner in response to the receipt of signals in each of said receiving means.

2. A radiant energy system including a plurality of signal collecting elements spaced along the line of propagation of a signal, receiving means coupled to each of said signal collecting elements, means for so deflecting a cathode ray beam in mutually perpendicular directions across a luminescent screen as to form a plurality of parallel lines thereon at a predetermined rate, means for coupling each of said receiving means to separately influence said cathode ray in a distinctive manner in response to signals.

3. A radiant energy system including a plurality of signal collecting elements spaced along the line of propagation of a signal, receiving means coupled to each of said signal collecting elements, means for so deflecting a cathode ray beam in mutually perpendicular directions across a luminescent screen as to form a plurality of parallel lines thereon and means for controlling the intensity of the line on said screen in response to signals picked up by one of said signal collecting elements and means for deflecting said line from its normal path in response to signals picked up by the other of signal collecting elements.

4. A radiant energy system including a plurality of signal collecting elements spaced along the line of propagation of a signal, receiving means coupled to each of said signal collecting elements, a cathode ray oscilloscope having a luminescent screen, means for deflecting a spot across said screen in one direction at a predetermined rate and means for deflecting said spot across said screen in a direction perpendicular to said first deflection at a higher rate to form a field of parallel lines, means for controlling the intensity of said spot in response to a signal from one of said receiving means and means for deflecting said spot in a direction at an angle to said lines in response to a signal from the other of said receiving means.

5. A radiant energy system including a plurality of signal collecting elements spaced along the line of propagation of a signal, receiving means coupled to each of said signal collecting elements, a cathode ray oscilloscope having a luminescent screen, means for deflecting a spot across said screen in one direction at a predetermined rate and means for deflecting said spot across said screen in a direction perpendicular to said first deflection at a higher rate to form a field of parallel lines, means for deflecting said spot in one direction in response to signals from one of said receiving means and means for additionally deflecting said spot in another direction in response to signals from the other of said receiving means.

6. A radiant energy system including a plurality of signal collecting elements spaced along the line of propagation of a signal, a cathode ray oscilloscope having a luminescent screen, means for deflecting a spot across said screen in one direction at a predetermined rate and means for deflecting said spot across said screen in a direction perpendicular to said first deflection at a higher rate to form a field of parallel lines, means for deflecting said spot in a direction perpendicular to said lines in response to a signal from the first one of said collecting elements along said line of propagation and means for additionally deflecting said spot in another direction in response to signals from a later one of said collecting elements along said line.

7. The method of measuring the angle of arrival of a radio signal which includes receiving said signal at a plurality of points spaced a definite distance apart along a line of propagation of said signal, deflecting a scanning ray simultaneously in a pair of mutually perpendicular directions at different predetermined rates to transverse an area in a plurality of parallel lines, influencing the intensity of said lines in response to said signal as received at one of said points, deflecting said ray from its normal path in response to said signal as received at the other of said points, measuring the distance between the change in intensity of said lines and said deflection from normal, said distance and said rate determining said angle.

NILS E. LINDENBLAD.
JAMES L. FINCH.